United States Patent [19]

Colligan

[11] Patent Number: 4,946,322
[45] Date of Patent: Aug. 7, 1990

[54] METHOD AND APPARATUS FOR CONFINING AND COLLECTING DUST AND PARTICLES PRODUCED BY MACHINE TOOLS

[75] Inventor: Kevin J. Colligan, Snoqualamie, Wash.

[73] Assignee: The Boeing Company, Seattle, Wash.

[21] Appl. No.: 305,793

[22] Filed: Feb. 2, 1989

[51] Int. Cl.$^5$ .............................................. B23C 1/20
[52] U.S. Cl. .................................... 409/137; 409/134; 408/67; 408/58; 29/DIG. 78; 406/151; 406/152; 406/92
[58] Field of Search ............................ 409/137, 134; 144/252 R, 252 A; 29/44, 61, 102, 94, 84, 78; 51/273; 408/58, 67; 173/57, 75, 207, 212, 213; 406/151-153, 86, 92

[56] References Cited

U.S. PATENT DOCUMENTS

| 1,581,719 | 4/1926 | Carter . | |
|---|---|---|---|
| 2,144,586 | 1/1939 | Kelley | 29/DIG. 78 X |
| 2,183,262 | 12/1939 | Kelley . | |
| 2,377,271 | 4/1945 | Schumann . | |
| 2,452,268 | 10/1948 | Schumann . | |
| 3,151,690 | 10/1964 | Grable | 175/212 X |
| 3,167,260 | 1/1965 | Gibbons et al. . | |
| 3,460,327 | 8/1969 | Johnson et al. | 406/152 X |
| 3,646,712 | 3/1972 | Quintana | 51/273 |
| 3,786,846 | 1/1974 | Mehring | 144/252 X |
| 3,837,383 | 9/1974 | Ko | 144/252 R X |
| 4,011,792 | 3/1977 | Davis | 409/137 |
| 4,037,982 | 7/1977 | Clement | 409/137 X |
| 4,071,812 | 2/1978 | Champayne | 51/273 X |
| 4,192,104 | 3/1980 | Patenaude | 144/252 R X |
| 4,409,699 | 10/1983 | Moorhouse | 409/137 |
| 4,422,239 | 12/1983 | Maier et al. | 51/273 X |
| 4,575,290 | 3/1986 | Adair | 409/132 |
| 4,646,480 | 3/1987 | Williams | 51/273 X |
| 4,778,315 | 10/1988 | Duffy et al. | 409/136 |
| 4,825,736 | 5/1989 | Catanese | 409/137 X |

FOREIGN PATENT DOCUMENTS

| 243285 | 10/1959 | Australia | 175/213 |
|---|---|---|---|
| 274514 | 8/1913 | Fed. Rep. of Germany | 51/273 |
| 324500 | 8/1920 | Fed. Rep. of Germany | 406/152 |
| 1238844 | 4/1967 | Fed. Rep. of Germany | 406/152 |
| 205040 | 12/1982 | Japan | 409/137 |
| 61-4646 | 1/1986 | Japan | 409/137 |
| 300807 | 12/1988 | Japan | 408/67 |
| 42987 | 11/1937 | Netherlands | 406/152 |
| 891400 | 12/1981 | U.S.S.R. | 51/273 |
| 1161358 | 6/1985 | U.S.S.R. | 51/273 |
| 2078934 | 1/1982 | United Kingdom | 173/57 |

Primary Examiner—Gil Weidenfeld
Assistant Examiner—Robert Schultz
Attorney, Agent, or Firm—Seed and Berry

[57] ABSTRACT

A method and apparatus for collecting dust and particles produced in machining a workpiece. The method and apparatus uses a shroud formed by a pair of frusta-conical walls spaced apart from each other to define an annular air passage therebetween. The shroud is mounted so that the machine tool extends through a central opening formed in the shroud. The annular air passage has an upper air inlet intersecting the air passage with a cylindrical component and a lower air outlet facing inwardly toward the machine tool. Pressurized air flows into the air passage and is thus directed from the air outlet toward the machine tool in a swirling manner. At the same time, a vacuum withdraws air from within the shroud to collect dust and chips produced by the machine tool.

4 Claims, 3 Drawing Sheets

METHOD AND APPARATUS FOR CONFINING AND COLLECTING DUST AND PARTICLES PRODUCED BY MACHINE TOOLS

FIELD OF THE INVENTION

This invention relates to the field of machine tools, and more particularly to an improved method and apparatus for collecting dust and particles produced when machining a workpiece.

BACKGROUND ART

Machine tools utilizing a cutting or abrasive tool are commonly used in a wide variety of manufacturing endeavors. A commonly used machine tool utilizes a rotating cutting tool having a number of sharp edges, and it performs its cutting function by rapidly cutting small particles from the workpiece. Another variety of rotating machine tool utilizes a tool having an abrasive surface that rotates or reciprocates to abrade a surface of the workpiece.

The collection of particles or "chips" produced by cutting tools and the collection of dust produced by abrasive tools has long posed a serious problem. Chips can be thrown from the cutting tool at a high velocity and thus injure the machine tool operator, particularly if he or she is not wearing eye protectors. Smaller chips from cutting tools and dust from abrasive machine tools can be inhaled by the operator thus potentially causing respiratory health problems. Furthermore, chips and dust, if not collected, can clutter up the working environment thus making the floors and work surfaces unsightly and slippery, and they can find their way into the bearings of rotating machinery and other precision devices thus potentially causing severe damage.

More recently still another dust and chip collection problem has arisen in the use of machine tools for machining composite materials, such as graphite-epoxy and the like, primarily for the aircraft industry. Machining such composite materials generates a large amount of chips and particles which are electrically conductive since they contain a great deal of graphite. The graphite chips and dust have a tendency to find their way into such electrical components as, for example, computer control terminals used to operate the machine tool. Thus, the problem of effectively collecting chips and dust produced by machine tools has recently become even more acute.

A number of devices have been developed in an attempt to collect dust and chips generated by machine tools. Although some of these devices are somewhat effective in collecting some types of dust and chips, none of these devices are adequately effective in collecting virtually all types of dust and chips, including dust and chips produced by machining composite materials.

One conventional device for collecting chips and dust produced by rotating machine tools utilizes a vacuum drawing air through a duct having an inlet positioned adjacent the machine tool. However, these conventional vacuum systems are not capable of collecting a sufficiently large percentage of the dust and particles for a number of reasons. First, it is difficult to make the vacuum air stream surround the cutting or abrasive tool from all sides. As a result, a significant amount of chips and dust can escape from areas in which the vacuum air stream is relatively slow. Second, the velocity of the vacuum air stream is generally not sufficiently high to counteract the sometimes very high outwardly directed velocity of chips and dust. As a result, high velocity chips and dust can often escape from vacuum collection systems.

One approach that has been taken to solve the above described limitations of conventional vacuum collection systems has been to surround the machine tool with a shroud. In theory, the shroud directs the vacuum air stream around the machine tool, and it also increases the velocity of the air stream adjacent the machine tool. However, for such shrouds to be effective, they must surround the cutting tool very closely and must also be positioned very close to the workpiece so that the gap between the lower edge of the shroud and the workpiece is very small. Shrouds that closely surround the cutting tool and are positioned very close to the workpiece have a tendency to obstruct the machine tool operator's view of the tool and workpiece, and can interfere with the movement of the workpiece, particularly when ribs, protrusions or the like extend upwardly from the upper surface of the workpiece.

Another conventional approach to collecting dust and chips has been to position air nozzles adjacent the cutting tool and direct an air stream from the nozzle toward the cutting tool. In fact, U.S. Pat. No. 4,011,792 to Davis discloses the use of such nozzles with a vacuum system using a shroud as described above. The air streams generated by these air nozzles may be effective in removing chips, shavings and the like from the machine tool and/or workpiece. However, these prior art air nozzle devices, whether used alone or with a vacuum shroud, do not contribute significantly to the collection of the chips and shavings. The air streams generated by these air nozzles impact on the machine tool from only a limited number of directions. Thus, while air streams may prevent dust and chips from escaping toward the nozzles, they do not prevent, and may even contribute to, the escape of dust and chips in other directions.

The prior art thus not only fails to recognize the limitations of these conventional approaches to collecting dust and chips, but it also fails to teach of any structure that is capable of effectively collecting virtually all types of dust and chips in a manner that does not interfere with the operation of machine tools.

DISCLOSURE OF THE INVENTION

It is an object of the invention to provide a method and apparatus that is effective in collecting dust and chips produced by machining virtually all types of materials, including graphite-epoxy composite materials.

It is another object of the invention to provide a method and apparatus for effectively collecting dust and chips produced by machine tools in a manner that does not interfere with the operation of the machine tools.

These and other objects of the invention are provided by an apparatus for collecting dust and chips from a machine tool used for machining a workpiece. A shroud having a central opening is positioned around the machine tool with the machine tool extending through the central opening. The shroud includes annular inner and outer walls spaced apart from each other to define an air passage therebetween. An air duct extends from a pressurized air source to the air passage of the shroud so that air flowing from the air passage arrests the outward movement of dust and chips from the machine tool. The method and apparatus also preferably includes another air duct extending from a vacuum source to the central opening of the shroud to draw air from the central opening and thus carry dust and chips from the central passage. The air passage is preferably devoid of any structure significantly obstructing the air passage so that the air passage extends continuously around the central opening and is thus able to create an unbroken curtain of air extending around and flowing toward the machine tool. The annular passage has an upper air inlet and a lower, inwardly facing air outlet. The air inlet preferably intersects the air passage with a cylindrical component so that air swirls around the machine tool as it flows from the air passage.

BEST MODE FOR CARRYING OUT THE INVENTION

Figure 1:
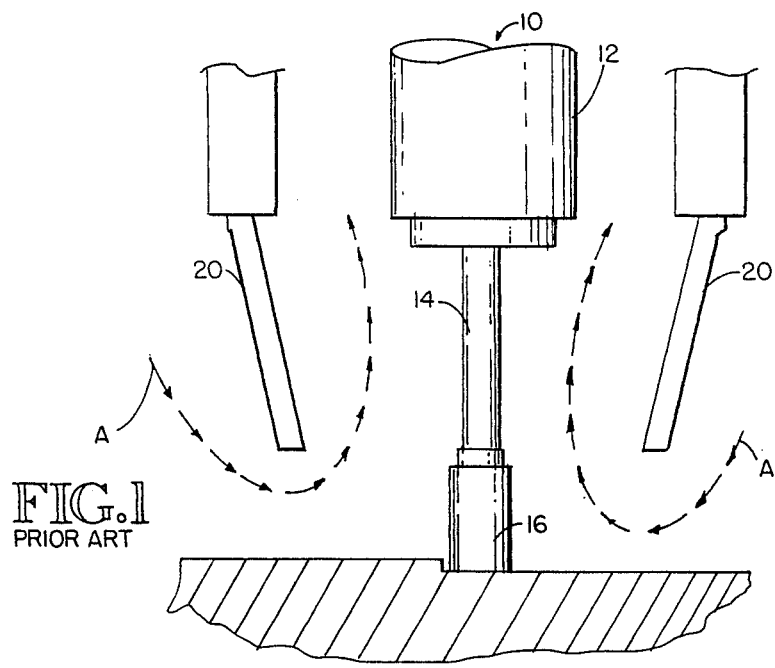
FIG. 1 is a cross-sectional schematic diagram of a prior art device for collecting dust and chips from a machine tool.

A prior art device for collecting dust and chips from a machine tool as illustrated in FIG. 1. The machine tool 10 includes a rotating spindle 12 having a tool 14 projecting downwardly therefrom. As is conventional in the art, the tool 14 is releasably mounted in the spindle 12 and a plurality of cutting blade 16 are formed at its lower end.

In operation, a workpiece W is positioned beneath or adjacent to tool 16. The lower end of the tool 16 projects below the upper surface of the workpiece W so that as the workpiece is moved to the right as illustrated in FIG. 1, the tool 16 machines a groove in the workpiece W. While the tool 16 is machining the workpiece W, it produces a large amount of particles, known as "chips." Other types of tools 16, such as those having an abrasive outer surface, produce dust rather than chips. In either case, it is highly desirable to collect the dust or chips generated by the tool 16.

One approach to collecting dust and chips produced by machine tools utilizes a generally cylindrical shroud 20 surrounding the tool 16. A duct connected to a vacuum (not shown) draws air from within the shroud. The vacuum thus produces an air stream as indicated by the arrows A in FIG. 1. In theory, the air stream carries the dust and particles generated by the tool 16 upwardly and into the vacuum collection system. However, in practice the outward momentum of the dust and chips is often so great that the air stream is not capable of collecting the dust or particles. Furthermore, the conventional approach illustrated in FIG. 1 requires that the air stream be directed very close to the tool 16. As a result, the lower ends of the shroud 20 must be placed very close to the machine tool 16 thereby obstructing the operator's view of the machine tool 16 and the adjacent portion of the workpiece W. Furthermore, the velocity of the air stream A can be made relatively large only by ensuring a relatively small gap between the lower end of the shroud 20 and the workpiece W. A small gap necessitates relatively close spacing between the shroud 20 and the workpiece W. Thus, the lower edge of the shroud 20 must be close to both the machine tool 16 and the workpiece W. This required configuration has two major disadvantages. First, it obscures the operator's vision of the tool 16 and workpiece W, as mentioned above. Second, the close spacing between the shroud 20 and workpiece W can cause the shroud 20 to strike ribs and other projections extending upwardly from the workpiece. Consequently, the approach illustrated in FIG. 1 is limited in its application.

Figure 2:
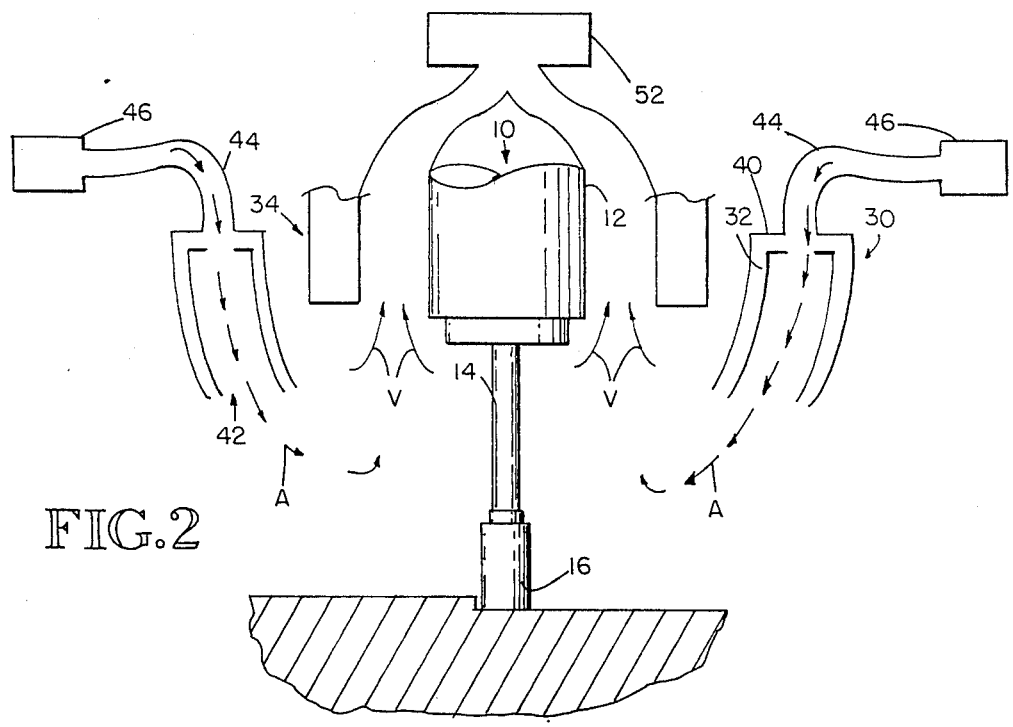
FIG. 2 is a cross-sectional schematic diagram of one embodiment of the inventive device for effectively collecting dust and chips from a machine tool.

The inventive method and apparatus for collecting dust particles is illustrated in schematic form in FIG. 2. In the interest of brevity, a machine tool used with the inventive collection method and apparatus will not be described since it is identical to the machine tool illustrated in FIG. 1 and is thus given identical reference numerals. The inventive apparatus and method utilizes an annular shroud 30 surrounding the machine tool 14. The shroud 30 is formed by an inner wall 32 having an open center defining a central opening 34. An outer wall 36 surrounds the inner wall 32 and is spaced apart therefrom to form an annular passage 38. The upper end of passage 38 is closed by an annular plate 40 while the lower end is open to define an air outlet 42 extending downwardly and inwardly toward the machine tool 14. A pair of ducts 44 receive pressurized air from a conventional blower. Another pair of ducts 50 are connected to a conventional vacuum source 52 to withdraw air from beneath the shroud 30 as illustrated by the arrows V in FIG. 2.

Figure 3:
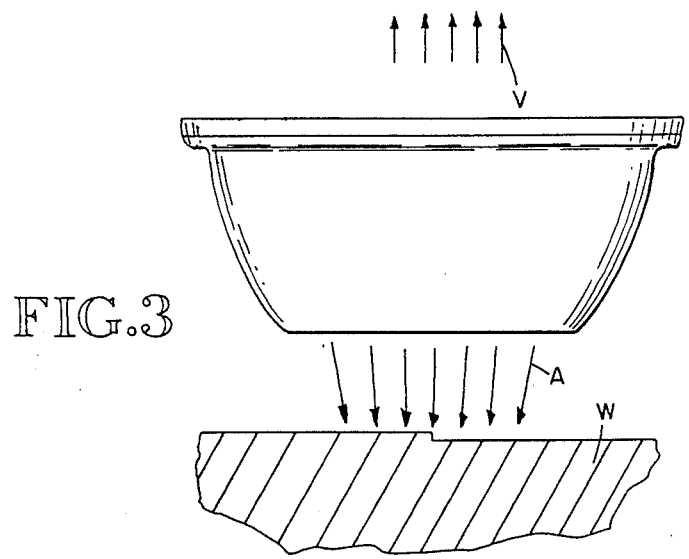
FIG. 3 is a side elevational schematic showing the air flow in the embodiment of the invention illustrated in FIG. 2.

With further reference to FIG. 3, the inventive method and apparatus operates by generating an inwardly directed air stream A toward the machine tool. The annular passage 38 formed by the inner and outer walls 32, 36, respectively, is preferably free of any obstructions so that the air stream A extends continuously around the tool 16. As a result, the outward movement of dust and chips is arrested regardless of the direction of outward movement. The air stream A has sufficient velocity to arrest the outward movement of substantially all dust and chips produced by the tool 14. Furthermore, since the inventive method and apparatus does not depend upon a vacuum for generating an inwardly directed air stream, the lower edge of the shroud can be placed relatively far from the workpiece W. Once the outward movement of the dust and chips has been haulted, the dust and chips can be collected easily by the air stream V created by the vacuum 52.

Although the inventive method and apparatus is illustrated in FIGS. 2 and 3 for use with a rotating machine tool 14 having cutting edges 16, it will be understood that it can be applied to rotating cutting tools having an abrasive working surface as well as other types of machine tools including those having a reciprocating movement. Furthermore, in the event that it is important only to restrain the outward movement of the dust and chips but not thereafter collect them, it is not necessary to use the vacuum 52 and ducts 50 as long as the air stream A generated by the shroud 30 completely surrounds the tool 14 thus preventing dust and chips from escaping in any direction.

Figure 4:
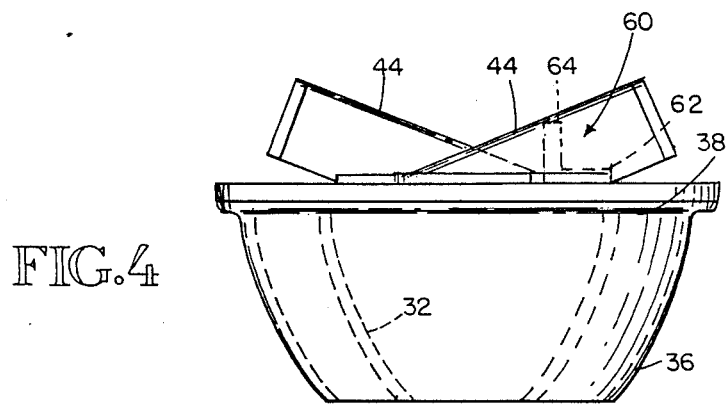
FIG. 4 is a side elevational view of an air nozzle shroud used in the embodiment of the invention illustrated in FIGS. 2 and 3.
Figure 5:
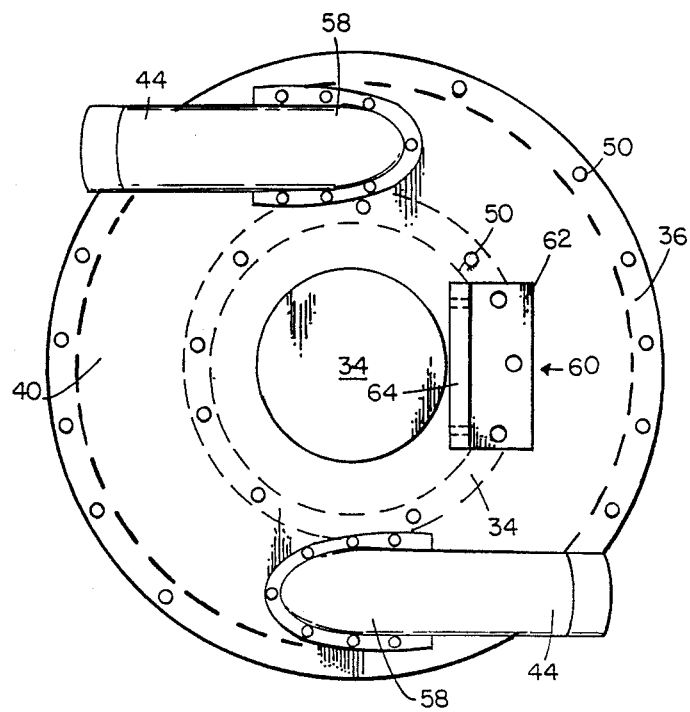
FIG. 5 is a top plan view of the air nozzle shroud illustrated in FIG. 4.

The structural details of the inventive shroud 30 are illustrated in FIGS. 4 and 5. The inner and outer walls 32, 36 are preferrably of a frusta-conical configuration.

However, other configurations may be used such as, for example, cylindrical walls having inwardly deflected lower edges. The inner and outer walls 32, 36 are secured to the annular plate 40 by suitable means such as rivets 50. As best illustrated in FIG. 4, the inner periphery of the annular plate 40 has a diameter that is smaller than the inner diameter of the inner wall 32. As a result, the flow of exhaust air is concentrated toward the center of the central opening 34. The ducts 44 extending from the blower 46 terminate at respective air inlets 58 that intersect the annular passage 38 with a circumferential component. As a result, the air flowing through the air passage 38 as well as the air A directed toward the machine tool 14 from the outlet 42 has a swirling motion. The swirling motion is better able to capture the outwardly moving dust and chips generated by the tool 14. An L-shaped mounting bracket 60 has a first leg 62 that is secured to the annular plate 40 and a second leg 64 that is secured to a suitable member on the machine tool.

It is thus seen that the inventive method and apparatus affectively collects dust and chips produced during machining operations. Furthermore, it does so in a manner that does not either obstruct the vision of the machine tool operator or interfere with the movement of the workpiece.

I claim:

1. In a device having a machine tool for machining a workpiece, an apparatus for collecting dust and chips generated by said machine tool during the machining of said workpiece, said apparatus comprising:
   a shroud having an annular inner wall surrounding a central opening, and an outer wall surrounding and spaced apart from said inner wall to define an annular air passage therebetween, said shroud being mounted so that said machine tool extends through said central opening and is surrounded by said inner wall;
   a vacuum source;
   a pressurized air source;
   a first air duct extending from said vacuum source to the central opening of said inner wall so that said vacuum source draws air from said central opening; and
   a second air duct extending from said pressurized air source to the annular air passage of said shroud so that said pressurized air source supplies air to said annular air passage whereby air flowing from said annular air passage arrests the outward movement of dust and chips from said machine tool and air flowing from said central passage toward said vacuum source carries said dust and chips from said central passage.

2. The apparatus of claim 1, wherein said annular air passage has an upper air inlet, and a lower, inwardly facing air outlet, said annular air passage being devoid of any structure significantly obstructing said annular air passage so that said annular air passage extends continuously around said central opening thereby creating an unbroken curtain of air extending around and flowing toward said machine tool.

3. The apparatus of claim 1, wherein said annular air passage has an upper inlet communicating with said second air duct, said air inlet intersecting said annular air passage in a direction having a cylindrical component so that air swirls around said machine tool as it flows from said annular air passage.

4. The apparatus of claim 1, wherein said inner and outer walls have a frusta-conical configuration with said walls extending inwardly toward said workpiece.

* * * * *